July 29, 1952        G. W. STIEHM        2,605,187
FOOD PACKING RACK AND METHOD OF PACKING FOOD ARTICLES
Filed Dec. 29, 1949
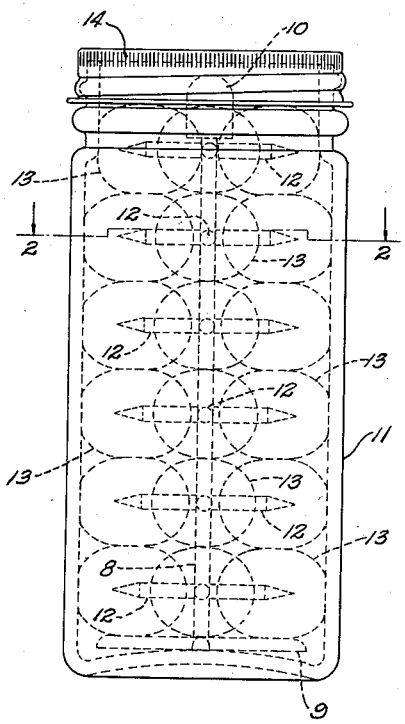
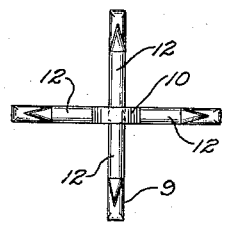
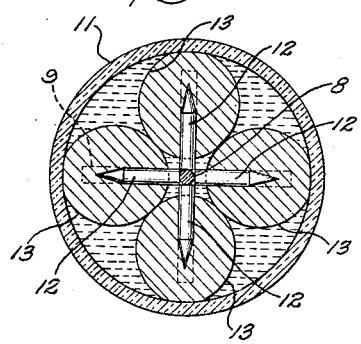
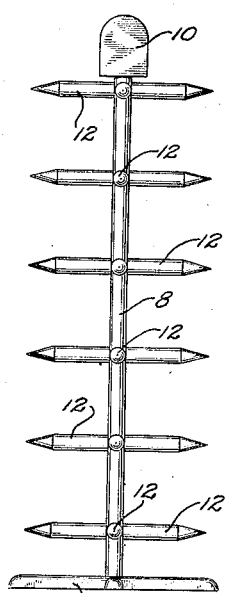
INVENTOR.
Glen W. Stiehm,
BY Morsell + Morsell
ATTORNEYS Patented July 29, 1952

2,605,187

UNITED STATES PATENT OFFICE 2,605,187

FOOD PACKING RACK AND METHOD OF PACKING FOOD ARTICLES

Glen W. Stiehm, Milwaukee, Wis., assignor to Jewett & Sherman Company, Milwaukee, Wis., a corporation of Wisconsin Application December 29, 1949, Serial No. 135,555

13 Claims. (Cl. 99—171)

1

This invention relates to improvements in food packing racks and method of packing food articles, and more particularly to a rack for packing a plurality of food products such as olives in containers.

Certain food products, as for example olives, are packed for retailing, in brine filled jars or bottles. Each bottle or jar of a given size should contain a predetermined number of the food items, and in the case of such items as olives, cherries and the like, the jars are filled with the items by hand packing, which is slow, laborious and expensive. In a filled bottle or jar the food items are rather tightly packed and the consumer frequently finds it quite difficult to dislodge and remove the uppermost items from the packed jar.

With the above in mind it is, therefore, a primary object of the present invention to provide a food packing rack adapted to have individual food products spacedly impaled thereon whereupon the packed rack may be easily and quickly inserted into a brine or liquor filled container whereby a desired number of the food products are compactly and conveniently housed within the container which is then covered, capped or sealed for transportation and storage, for subsequent opening and access to the packed food products by the ultimate purchaser and consumer.

A further object of the invention is to provide a food pack of the character described of a nature permitting easy removal of the packed rack from the container after the latter is opened whereupon the consumer may easily remove any desired number of the food products from the rack and then return the partially loaded rack to the liquor filled container.

A further object of the invention is to provide a food packing rack which will insure that like containers to be packed will contain uniform numbers of the food product and which will arrange the food products in the containers in attractive, orderly fashion.

A further object of the invention is to provide a food packing rack susceptible of various household usages after the food products originally impaled thereon have been consumed.

A further object of the invention is to provide an expeditious and convenient method of packing uniform food items in a wide-mouthed container to produce a solid pack within the container and to permit easy removal of the food items from the container.

A further object of the invention is to provide a food packing rack which is inexpensive to manufacture, which facilitates the packing of food products in containers, which is neat and attractive in appearance, and which is well adapted for the purposes set forth.

With the above and other objects in view the invention consists of the improved food pack and method and the parts, combinations and steps incident thereto, as set forth in the claims, and all equivalents thereof.

In the accompanying drawing in which the same reference characters indicate the same parts in all of the views:

Fig. 1 is a side view of a glass bottle or jar containing the improved food packing rack with the latter having food products such as olives impaled thereon;

Fig. 2 is a horizontal sectional view taken on line 2—2 of Fig. 1;

Fig. 3 is a side view of the improved food packing rack; and

Fig. 4 is a plan view thereof.

While the improved food packing rack is susceptible of use in connection with the packing of various types of food products of relatively small and uniform size and shape such as cherries, pickled onions and the like, it finds particular utility in connection with the packing of stuffed olives in jars or bottles. While the invention will be so described, it is not to be limited to a pack solely for olives.

The food packing rack per se shown in Figs. 3 and 4 is in the form of a tree with a central vertical axial stem 8, mounted on a horizontal base 9, which comprises a pair of diametrically crossed legs. The top of the stem 8 rigidly carries an enlarged tab 10 adapted to be manually engaged by the fingers of a person to permit insertion of the rack into the jar or container 11 or removal of the rack from said container. At spaced intervals on the stem 8 are series of pointed spears or arms 12 which are horizontally disposed and extend radially outwardly from the stem 8. The spears of each horizontal series are preferably separated at 90° angles from one another.

The entire food packing rack may be cast or molded of plastic or metal such as stainless steel, or it may be formed of wood, or it may be formed of a molded wax coated paper or pulp material.

When a jar or container 11 is to be packed with a plurality of food products such as olives or the like the rack, initially removed from the jar or container 11, has an olive impaled on each of the spears 12. When the food product used is stuffed olives the impaling of the same on the rack spears 12 is facilitated by small openings in the olives 13 which were previously formed in the olives for depitting. These openings, therefore, conveniently receive the pointed ends of the spears 12 and the olives are easily manually impaled on the spears of the rack to about the extent shown in Figs. 1 and 2. After the rack is thus manually loaded with the olives or other food products the packer grasps the tab 10 at the upper end of the rack and inserts the loaded rack into the container 11, it being noted that the rack is of a height to be entirely contained within the container therefor. The container, with the packed rack therein, is next filled with a suitable brine or liquor and finally a cap or cover 14 is mounted on the container to close and seal the open end thereof. The packed container is then ready for storage or shipment.

When the consumer wishes to use any of the products in the container 11 it is merely necessary to remove the cap or cover 14 and grasp the tab portion 10 of the rack, raising the rack out of the container a desired distance. Thereupon as many olives or other food products as desired may be removed from the exposed spears. This is accomplished quickly and easily and without bruising or damaging the dislodged olives. The rack, after the desired number of olives have been removed for immediate use, is then dropped into the container and is maintained in this position until it is desired to remove additional olives from the container and rack.

A container packed with individual food products by means of the improved rack holds the packed products in a neat and orderly fashion and the packer is always sure of having a predetermined number of the products in a container of a given size or capacity. After all of the food products have been removed from the rack and consumed, the rack may be used in the household for such purposes as mounting and displaying appetizers and snacks. It may further be used for place names at dinner parties or to impale pieces of candy or bon bons for ready availability, and it may also be used in bowls for the mounting or support of flowers.

The improved food packing rack is of very simple construction, is easy and convenient to use, is novel and attractive in appearance, and is well adapted for the purposes described.

The improved method by which containers may be packed with relatively uniform food items or articles is simple and expeditious and results in a relatively solid pack within the container of a nature that the articles within the container may be easily withdrawn and there is ready access to any selected article within the container.

What is claimed as the invention is:

1. An olive rack for removable disposition in a cylindrical container, comprising a vertical stem, and tiers of horizontally projecting angularly separated spears, each being adapted to have a relatively uniform olive impaled thereon, the spears of one tier being so spaced relative to one another and the spacing between tiers being such that olives on the spears of a tier engage olives on adjacent spears of the same tier and also engage olives on the spears of tiers thereabove and below.

2. The combination with a cylindrical container, of a food packing rack removably housed entirely within a cylindrical zone therewithin of substantially less diameter than that of the container, said rack consisting of a central rigid stem having at spaced intervals along its length series of angularly separated radially projecting pointed arms with each arm being adapted to have a similar food article impaled thereon to project beyond its arm into contact with the inner wall of the container, the container being thereby completely packed and the impalement of the food products together with their impingement against the container wall serving to hold the food products snugly against unauthorized shifting and displacement.

3. The combination with a cylindrical container, of a food packing rack removably housed entirely within a central cylindrical zone therewithin of substantially less diameter than that of the container, said rack consisting of a central rigid stem having at spaced intervals along its length series of angularly separated radially projecting pointed arms with each arm being adapted to have a uniformly sized and globular edible impaled thereon to project beyond its arm into contact with the inner wall of the container, the container being thereby completely packed and the impalement of the edibles together with their impingement against the container wall serving to hold the edibles snugly against unauthorized shifting and displacement, the rack with the edibles thereon being removable longitudinally from the container to give access to any selected impaled edible thereon.

4. The combination with a cylindrical container, of an olive holding rack removably housed entirely within a central cylindrical zone therewithin of substantially less diameter than that of the container, said rack consisting of a central rigid stem having at spaced intervals along its length series of angularly separated horizontally projecting pointed arms, with each arm being adapted to have an olive impaled thereon to project beyond its arm into contact with the inner wall of the container, the impaled olives being in surface contact with adjacent olives, but any impaled olive being accessible for individual removal from the rack upon withdrawal of the rack from the container.

5. An olive holding rack for removable disposition in a cylindrical container, comprising a vertical stem, and vertically spaced tiers of arms projecting horizontally from said stem, the arms of each tier being angularly separated and each having a relatively uniform olive removably impaled thereon and solely supported thereby, withdrawal of the rack from a container in which it is housed giving selective access to any or all olives impaled on said arms, the angular spacing of the arms in each tier and the axial spacing of the tiers producing a solid pack when olives are impaled on said arms and supported thereby, said rack and the olives thereon being adapted to substantially fill the container in which the same is disposed.

6. The combination with a wide mouth container, of an olive holding rack removably housed entirely within a central zone within the container of substantially less size than that of the container, said rack including a central rigid stem with a plurality of arms projecting radially from said stem and disposed in an array corresponding to the shape of the container, said arms being arranged in a series of axially spaced horizontal rows, the circumferential spacing of said arms in each row and the axial spacing of the rows serving to produce a solid pack when olives are impaled on said arms and supported thereby, said support with olives thereon being located within and substantially filling said container.

7. The combination with a cylindrical container, of an olive holding rack removably housed entirely within a central cylindrical zone within the container, said rack including a central rigid stem having at intervals along its length tiers of angularly separated horizontally projecting arms with each arm having means to have an olive impaled thereon with the radially outer portions of the olives being directly adjacent the inner wall of the container and retained thereby against separation from said arms, the circumferential spacing of the arms in each tier and the axial spacing of the tiers producing, when the arms have olives impaled thereon, a solid pack, the rack with olives thereon being located within and substantially filling the container, the relation of the size of the jar to the packed rack being such that a single ring of olives forms a relatively tightly packed layer leaving an axially disposed opening of a size less than sufficient to receive an olive with said central stem occupying the openings in the several layers of olives.

8. An olive rack for removable disposition in a cylindrical container comprising a vertical stem, and tiers of horizontally projecting angularly separated arms, each of said arms being constructed and arranged to provide individual support for a relatively uniform olive, the arms of one tier being so spaced relative to another and the spacing between tiers being such that olives on the arms of a tier engage olives on adjacent arms of the same tier and also engage olives on the arms of tiers thereabove and therebelow.

9. The combination with a cylindrical container of a food packing rack removably housed entirely within a central cylindrical zone therewithin of substantially less diameter than that of the container, said rack consisting of a central rigid stem having at spaced intervals along its length series of angularly separated radially projecting arms with each arm being constructed and arranged to support a uniformly sized and globular edible to project beyond its arm into contact with the inner wall of the container, the container being thereby completely packed and the support of the edibles by the arms together with their impingement against the container wall serving to hold the edibles snugly against unauthorized shifting and displacement, the rack with the edibles thereon being removable longitudinally from the container to give access to any selected edible carried thereby.

10. The combination with a container, of a food packing rack removably housed entirely within a zone therewithin of substantially less size than that of the container, said rack consisting of a central stem having at spaced intervals along its length series of angularly separated radially projecting arms with each arm having means to carry a similar food article thereon to project beyond its arm into adjacency with the inner wall of the container, the supported food articles and the spacing of the various series of arms and the angular separation of the arms in each series producing a substantially packed container, and the mutual contact of the food products and their adjacency with the wall of the container serving to hold the food products snugly against unauthorized shifting and displacement.

11. The combination with a wide-mouth container, of a plurality of spaced apart tiers of arms removably housed within a central zone within the container, each tier of arms including at least two angularly separated arms and each arm having a relatively uniform food article mounted thereon and projecting beyond its arm into adjacency with the inner wall of the container, the food articles in a given tier of arms being in contact with food articles on adjacent arms of the same tier and also being in contact with food articles on the arms of an adjacent tier, the container being thereby substantially completely packed and the mounting of the food articles together with their adjacency to the container wall and contact with adjacent food articles serving to hold the articles snugly against unauthorized shifting and displacement, the tiers of arms with the food articles mounted thereon being removable from the container to give access to a selected food article.

12. The method of packing uniform edibles within a container, comprising individually impaling the edibles on spaced radial arms to a distance producing contact of adjacent impaled edibles, similarly impaling additional edibles on another series of arms at a distance to produce contact with edibles on the first-mentioned arms, and finally inserting said impaled edibles in a wide-mouth container in a manner to produce substantial contact between the edibles and the container wall.

13. The method of packing olives or like uniform food articles in a container, comprising the steps of first impaling the olives on a tier of spaced radial arms to a distance producing contact of adjacent olives in said tier, then similarly impaling additional olives on other tiers of spaced radial arms, and finally inserting all of said tiers of arms with olives thereon in a container with the various tiers of arms in superimposed relation and so spaced as to produce contact between the olives on the arms of a given tier with the olives on the arms of a tier thereadjacent with all of the olives being in adjacency with the container wall.

GLEN W. STIEHM.

REFERENCES CITED

The following references are of record in the file of this patent:

UNITED STATES PATENTS

| Number | Name | Date |
| --- | --- | --- |
| 829,036 | Ryan | Aug. 21, 1906 |
| 854,820 | Goodwin | May 28, 1907 |
| 919,173 | Hurff | Apr. 20, 1909 |
| 1,191,165 | Eisenhardt | July 18, 1916 |
| 1,308,253 | Oftedahl | July 1, 1919 |
| 1,611,397 | Wells | Dec. 21, 1926 |
| 2,020,534 | Brown | Nov. 12, 1935 |